United States Patent
Mehat et al.

(10) Patent No.: US 9,146,763 B1
(45) Date of Patent: Sep. 29, 2015

(54) MEASURING VIRTUAL MACHINE METRICS

(71) Applicant: Google Inc., Mountain View, CA (US)

(72) Inventors: Sanjeet Singh Mehat, Seattle, WA (US); Michael H. Waychison, Seattle, WA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/833,245

(22) Filed: Mar. 15, 2013

Related U.S. Application Data

(60) Provisional application No. 61/616,857, filed on Mar. 28, 2012.

(51) Int. Cl.
*G06F 9/455* (2006.01)

(52) U.S. Cl.
CPC ................................. *G06F 9/45533* (2013.01)

(58) Field of Classification Search
None
See application file for complete search history.

(56) References Cited

U.S. PATENT DOCUMENTS

| | | |
|---|---|---|
| 7,856,549 B2 | 12/2010 | Wheeler |
| 8,095,931 B1 | 1/2012 | Chen et al. |
| 8,099,487 B1 | 1/2012 | Smirnov et al. |
| 8,601,471 B2 | 12/2013 | Beaty et al. |
| 8,782,322 B2 * | 7/2014 | Houlihan et al. ................. 711/6 |
| 2007/0204266 A1 | 8/2007 | Beaty et al. |
| 2008/0320123 A1 * | 12/2008 | Houlihan et al. ............ 709/224 |
| 2009/0172666 A1 * | 7/2009 | Yahalom et al. ................... 718/1 |
| 2011/0072138 A1 | 3/2011 | Canturk et al. |
| 2012/0233609 A1 | 9/2012 | Blythe et al. |
| 2013/0124714 A1 * | 5/2013 | Bednar ......................... 709/224 |
| 2013/0198319 A1 * | 8/2013 | Shen et al. .................... 709/217 |

* cited by examiner

*Primary Examiner* — Emerson Puente
*Assistant Examiner* — Dong Kim
(74) *Attorney, Agent, or Firm* — Fish & Richardson P.C.

(57) ABSTRACT

Methods, systems, and apparatus, including computer programs encoded on a computer storage medium, for measuring virtual machine metrics. In one aspect, a method includes initializing a virtual machine, the virtual machine being associated with virtual hardware comprising a virtual metrics device, the virtual metrics device being configured to report values of a virtual machine metric that measures the performance of the virtual machine; receiving data identifying the virtual machine metric and a virtual machine memory address to which the virtual machine writes values of the virtual machine metric; reading one or more values of the virtual machine metric from the virtual machine memory address; and generating a report based on the one or more metric values.

21 Claims, 5 Drawing Sheets

MEASURING VIRTUAL MACHINE METRICS

CROSS REFERENCE TO RELATED APPLICATION

This application claims the benefit under 35 U.S.C. §119(e) of U.S. Patent Application No. 61/616,857, filed Mar. 28, 2012, entitled "Measuring Virtual Machine Metrics," which is incorporated by reference herein in its entirety.

BACKGROUND

This specification relates to monitoring the performance of virtual machines.

Cloud computing is network-based computing in which collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs), and each VM launched by a user is included in a cluster of other VMs launched by the user.

SUMMARY

In general, one innovative aspect of the subject matter described in this specification can be embodied in methods that include the actions of initializing a virtual machine, the virtual machine being associated with virtual hardware comprising a virtual metrics device, the virtual metrics device being configured to report values of a virtual machine metric that measures the performance of the virtual machine; receiving data identifying the virtual machine metric and a virtual machine memory address to which the virtual machine writes values of the virtual machine metric; reading one or more values of the virtual machine metric from the virtual machine memory address; and generating a report based on the one or more metric values.

Other embodiments of this aspect include corresponding systems, apparatus, and computer programs, configured to perform the actions of the methods, encoded on computer storage devices.

These and other embodiments can each optionally include one or more of the following features. Reading one or more values of the virtual machine metric can include: mapping the virtual machine memory address to a host memory address. The virtual machine metric can be a triggered metric, and the virtual metrics device can be further configured to indicate when reported values of the virtual machine metric are valid.

The virtual machine metric can be a non-triggered metric. Reading the one or more values of the virtual machine metric can be performed without further interaction with the virtual machine. The virtual machine can be associated with a virtual metrics driver, wherein the virtual metrics driver is configured to: identify one or more virtual machine metrics available from the virtual metrics device; and identify a respective virtual machine memory address to which values of each of the one or more virtual machine metrics are written.

The virtual metrics device can be configured to expose a name of each of the one or more virtual machine metrics and the respective virtual machine memory address to which values of each of the one or more virtual machine metrics are written. The method can further include providing a high-level configuration to the virtual machine, wherein the high-level configuration identifies the virtual machine metric and configures a component of the virtual machine to generate values of the virtual machine metric.

Particular embodiments of the subject matter described in this specification can be implemented so as to realize one or more of the following advantages. Virtual machine metrics that measure the performance of a virtual machine can be measured by the underlying host machine in a low-latency manner without interrupting the operation of the virtual machine. The metrics that can be measured are configurable and can be measured at varying levels of granularity. For example, the scope of the metrics being measured and the frequency at which the metrics are measured can be changed. Additionally, metrics can be measured even while the guest operating system of the virtual machine is otherwise not responsive. For example, metric values can be measured when the guest operating system has crashed, is hanging, or when there are network issues. Metric values read during otherwise non-responsive states can provide useful information in identifying the cause of the problem, e.g., identifying the event that caused the virtual machine to enter the non-responsive state.

BRIEF DESCRIPTION OF THE DRAWINGS

Like reference numbers and designations in the various drawings indicate like elements.

DETAILED DESCRIPTION

Figure 1:
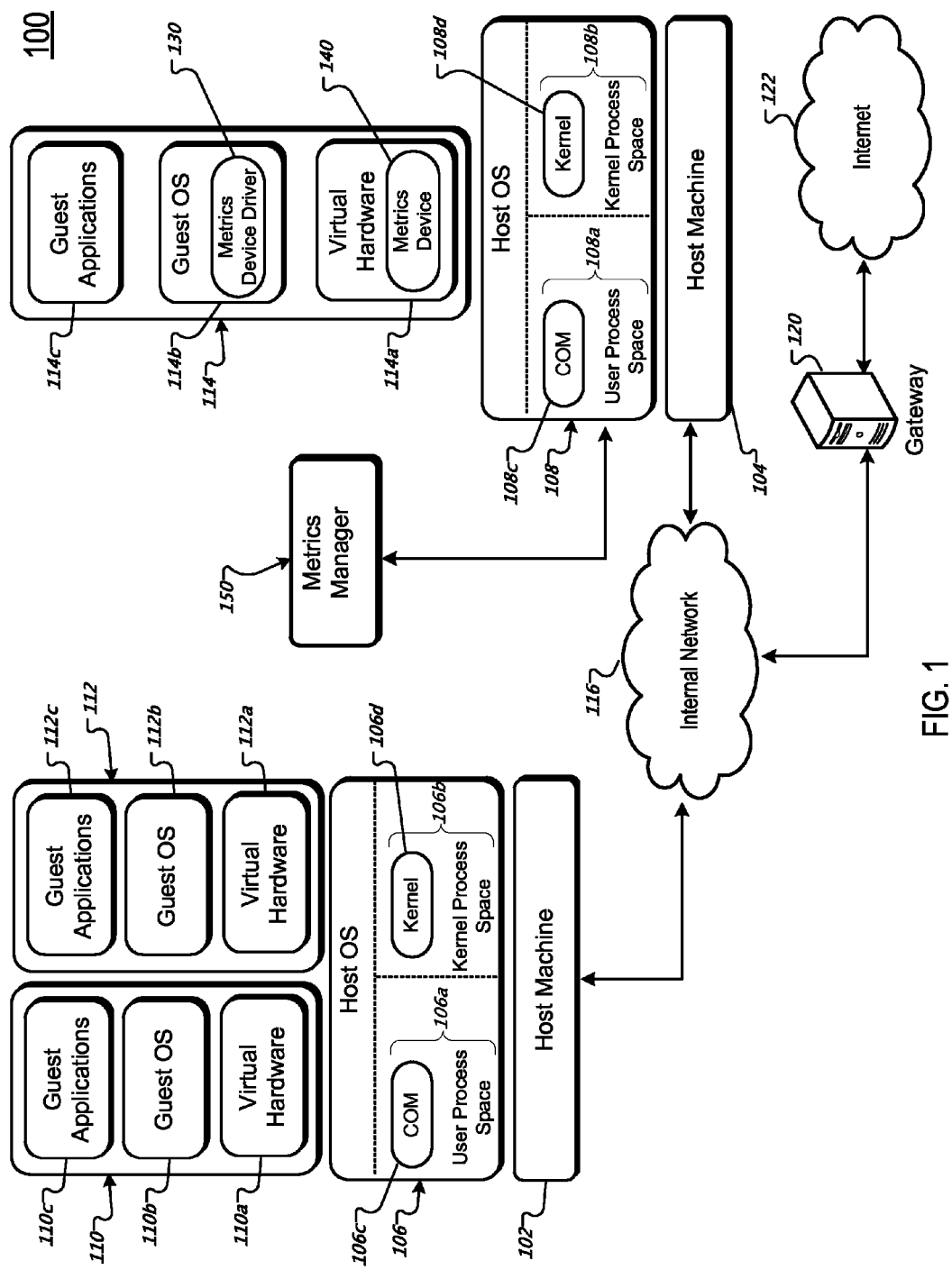
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatuses responsible for routing data communication traffic between the internal network 116 and the external network 122. Other types of external networks are possible.

Each host machine executes a host operating system or other software that virtualizes physical hardware (e.g., the underlying host machine hardware or other hardware) and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system. Each VM is also allocated virtual disk blocks from one or more virtual disk drives for use by the guest software executing on the VM. The term "virtual disk drive," as used herein, is a broad term encompassing its plain and ordinary meaning, including, but not limited to, a simulated version of a physical disk drive. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example.

In addition to virtual memory and virtual disk resources, VMs can be allocated network addresses through which their respective guest software can communicate with other processes reachable through the internal network 116 or the Internet 122. The network addresses can be, for example, Internet Protocol (IP) addresses. In some implementations, each VM is allocated one or more unique Internet Protocol (IP) version 4 or version 6 addresses, one or more User Datagram Protocol (UDP) port numbers, or both. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system, other cluster management software executing on a separate computing device, or both.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. Similarly, the kernel process space 108b is virtual memory reserved for the host operating system 108's kernel 108d.

The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c or communication process 108c). In some implementations, the communication process executes in the user process space (e.g., user process space 106a or user process space 108a) of a host operating system (e.g., host operating system 106 or host operating system 108). In other implementations, the communication process can execute in the kernel process space (e.g., kernel process space 106d or kernel process space 108d) of the host operating system. There can be a single communication process for all VMs executing on a host machine or multiple communication processes, one for each VM executing on a host machine. In yet further implementations, some portion of the communication process executes in the user process space and another portion executes in the kernel process space. For example, the communications process 106c receives packets sent by VM 110 or VM 112 and forwards the packets to the destination identified in the packet.

In various implementations, it may be desirable for a system administrator or other entity managing the operation of host machine 102 and host machine 104 to monitor the performance of virtual machines executing on the host machines. In these cases, when a virtual machine whose performance is to be monitored is created by a user, a high-level configuration is distributed to the newly-created virtual machine. The configuration identifies names of virtual machine metrics that the guest software of the virtual machine is configured to measure and configures a component of the virtual machine to generate values of each identified virtual machine metric. This configuration can be static, so that the named metrics cannot be altered after the virtual machine is created, or dynamic, so that the named metrics can be modified after the virtual machine is created.

The virtual machine metrics measure the performance of the virtual machine and can include triggered metrics, non-triggered metrics, or both. A triggered metric is a metric whose value is only valid when the entity that is reporting the metric values indicates that the metric is valid. Examples of triggered metrics can include a metric that indicates whether the virtual machine has booted, e.g., finished initializing, a metric that indicates whether the virtual machine has run out of memory, a metric that indicates when a certain task has been completed by the virtual machine, and so on. A non-triggered or passive metric is a metric whose value is always valid. Examples of non-triggered metrics can include: the amount of free memory, the amount of dirty memory, the average load of the guest operating system, the amount of memory being used for a particular task, how many times a certain event has occurred, and so on.

The virtual hardware of the virtual machine whose performance is to be monitored can include a virtual metrics device, e.g., virtual metrics device 140. The virtual metrics device can be, e.g., a virtual Peripheral Component Interconnect (PCI) card. The virtual metrics device is configured to collect values of one or more of the metrics that are identified by the configuration. The metric values that the virtual metrics device is configured to collect can be specified by the system administrator or other entity managing the operation of the host machines. For example, if the guest operating system maintains a counter of the amount of free memory available to the virtual machine, a system administrator may configure the virtual metrics device to collect values of the amount of free memory and report those values to the host machine.

The virtual machine whose performance is to be monitored also includes a virtual metrics device driver, e.g., virtual metrics device driver 130, that communicates with the virtual metrics device. The virtual metrics device driver can be included in the virtual machine's guest software, e.g., as part of the guest operating system. The virtual metrics device driver communicates with the virtual metrics device to provide information identifying the metrics that are available from the virtual metrics device to a metrics manager, e.g., metrics manager 150. The metrics manager 150 can be executed by the host machine 104 as part of the kernel process space 108b or the user process space 108a. Alternatively, the metrics manager 150 can execute on a separate data processing apparatus. The metrics manager 150 can receive information identifying metrics and determine memory addresses where values of those metrics are written. The metrics manager 150 can then read the metric values from the memory addresses and, e.g., generate a report based on the values.

Figure 2:
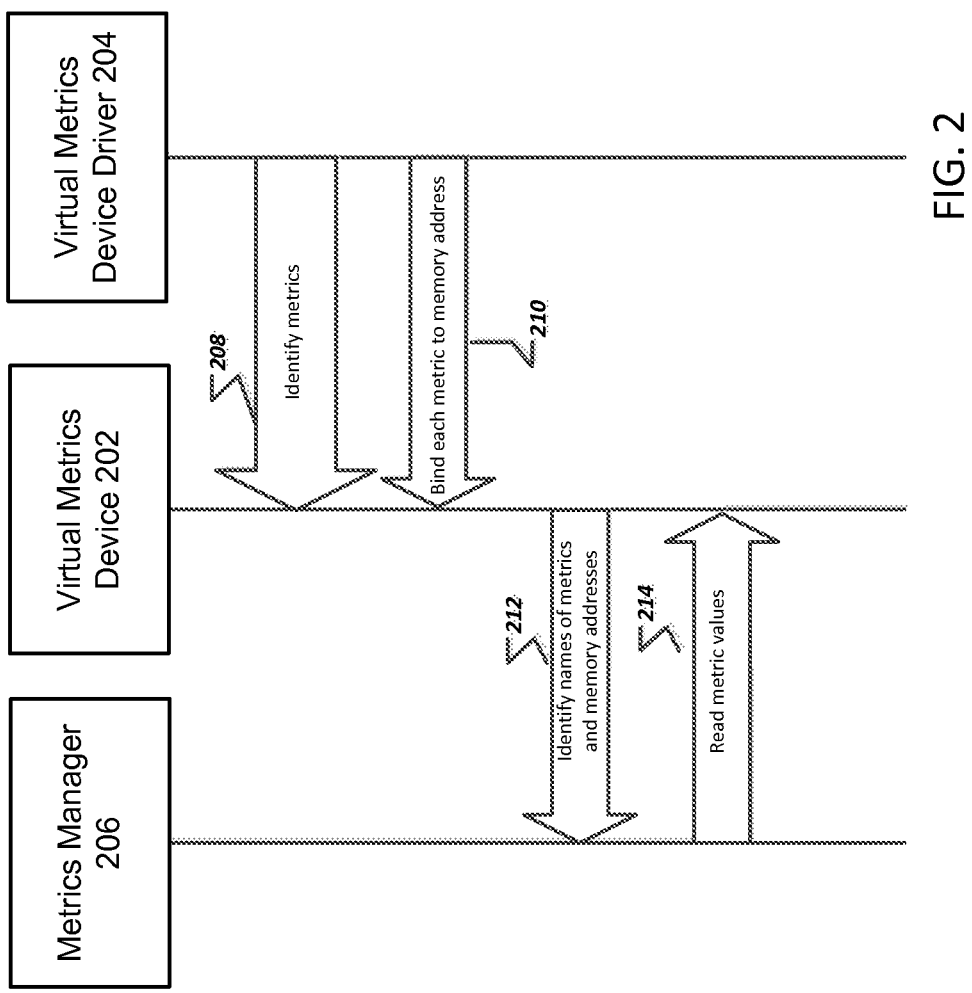
FIG. 2 is a diagram illustrating measuring virtual machine metrics.

FIG. 2 is a diagram illustrating measuring virtual machine metrics. As illustrated in FIG. 2, virtual metrics device driver 204 identifies 208 the metrics that a virtual metrics device 202 is configured to collect. The metrics are selected, e.g., by a system administrator, from one or more metrics named in a high-level configuration provided to a virtual machine whose performance is being measured. The virtual metrics device 202 can be included in the virtual hardware of the virtual machine and the virtual metrics device driver 204 can be part of the guest operating system of the virtual machine. Alternatively, the virtual metrics device driver 204 can be a separate component of the guest software of the virtual machine. For example, the virtual metrics device driver 204 can, when the virtual machine is initializing, probe the virtual metrics device 202 and identify the metric values that the virtual metrics device 202 has been configured to collect.

The virtual metrics device driver 204 then binds 210 each identified metric to a respective virtual machine memory address in the virtual metrics device 202. That is, the virtual metrics device driver 204 provides information identifying a respective virtual memory address from which values of each identified metric can be read. The virtual machine memory address can be an address in the memory address space of the virtual machine.

For example, during initialization of the virtual machine, other components of the virtual machine, e.g., other processes executing in the guest operating system of the virtual machine, provide data identifying the metrics that they have been configured to collect and the virtual memory addresses to which they are writing values of those metrics to the virtual metrics device driver 204. The virtual metrics device driver 204 can determine whether any of the data identifies a metric that the virtual metrics device has been configured to collect. For each of those metrics, the virtual metrics device driver 204 provides data identifying the virtual memory address to which the metric is being written to the virtual metrics device 202.

The virtual metrics device 202 provides data that identifies 212 the names of the metrics and the virtual machine memory address corresponding to each metric to a metrics manager 206. The metrics manager 206 can be, e.g., a process that executes in the kernel space of the underlying host machine. Alternatively, the metrics manager 206 can execute in user space or on a separate computing device.

As data is written to the virtual memory addresses bound in the virtual metrics device 202, the metrics manager 206 reads 214 metric values from those memory addresses. For example, the metrics manager 206 can include or be able to communicate with a direct memory access (DMA) engine that, once the data that identifies a virtual machine metric and the corresponding virtual machine memory address for the metric has been received, can translate the virtual machine memory address to a host memory address. For example, the DMA engine can map the virtual machine memory address to a host memory address by consulting a pre-determined mapping of virtual machine memory addresses to host memory addresses. The host memory address can be, e.g., a virtual memory address or a physical memory address in the address space of the underlying host machine. The DMA engine can then associate the host machine memory address with the virtual machine memory address. The DMA engine can monitor the host machine memory address and, when data is written to that memory address, the DMA engine can identify the written data as a value of the corresponding metric. Alternatively, the DMA engine can read from the host machine memory addresses at specified time intervals. Thus, once the metrics manager 206 receives the data identifying the names of the metrics and the virtual machine memory addresses for the metrics, the metrics manager 206 can read the values of non-triggered metrics without any further interaction with the virtual machine. If one or more of the identified virtual machine metrics is a triggered metric, when a valid value is written to the virtual machine memory address for the triggered metric, the metrics manager 206 can receive data specifying that the value of the metric value is valid and can be read from the corresponding memory address.

The metrics manager 206 can then store the metric values and generate a report based on the values, e.g., at predetermined time intervals or in response to a user request. The values can also be used to generate and transmit an alert to an entity monitoring the performance of the virtual machine. For example, an alert can be generated whenever a value of a particular metric is below a threshold value. Additionally, instead of or in addition to generating a report or an alert, the metric values can be used to adjust the performance of the virtual machine. For example, based on the metric values, the amount of memory or the amount of processing power allocated to the virtual machine can be adjusted or the virtual machine can be migrated to a different host machine. In some implementations, when values of one or more metrics meet specified criteria, the performance adjustments to the virtual machine can be made automatically. For example, if the value of an amount of free memory metric reported by the virtual machine is below a threshold value over a specified period of time, the amount of memory allocated to the virtual machine can automatically be increased.

Figure 3:
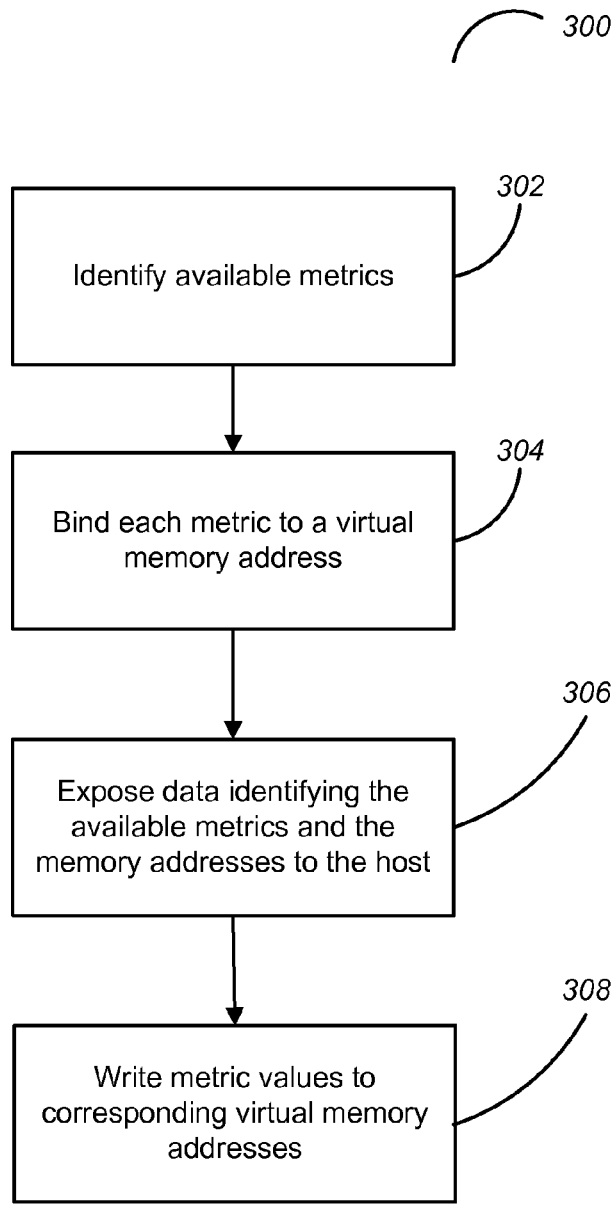
FIG. 3 is a flow diagram illustrating an example technique of providing values of virtual machine metrics to a metrics manager.

FIG. 3 is a flow diagram illustrating an example technique 300 of providing values of virtual machine metrics to a metrics manager. The technique 300 can be performed by one or more data processing apparatuses. For example, a virtual machine (e.g., virtual machine 114 of FIG. 1) executing on a host machine (e.g., host machine 104 of FIG. 1) can be used to perform the technique 300.

The virtual machine identifies 302 available metrics. For example, the virtual machine's virtual hardware can include a virtual metrics device that has been configured to collect metric values based on data generated by, e.g., the virtual machine's guest software. The metrics that the virtual metrics device has been configured to collect can be identified during initialization of the virtual machine.

The virtual machine binds 304 each metric to a virtual memory address in the virtual metrics device. For example, a virtual metrics device driver included in the guest operating system of the virtual machine can receive information from components of the virtual machine that have been configured to generate values of virtual machine metrics. The information can identify the virtual machine metric and the virtual machine memory address to which values of the metric are being written. The virtual machine device driver can, for each metric that the virtual metrics device has been configured to collect, bind the virtual memory address for the metric to the virtual metrics device.

The virtual machine exposes 306 data identifying the available metrics and the memory addresses to the host. For example, the data can be formatted in accordance with an application programming interface (API) that has previously been made available to the host.

The virtual machine writes 308 metric values to the corresponding virtual memory addresses. That is, the components of the virtual machine that have been configured to generate the metric values write the values to the virtual memory addresses that they identified to the virtual metrics device driver.

Figure 4:
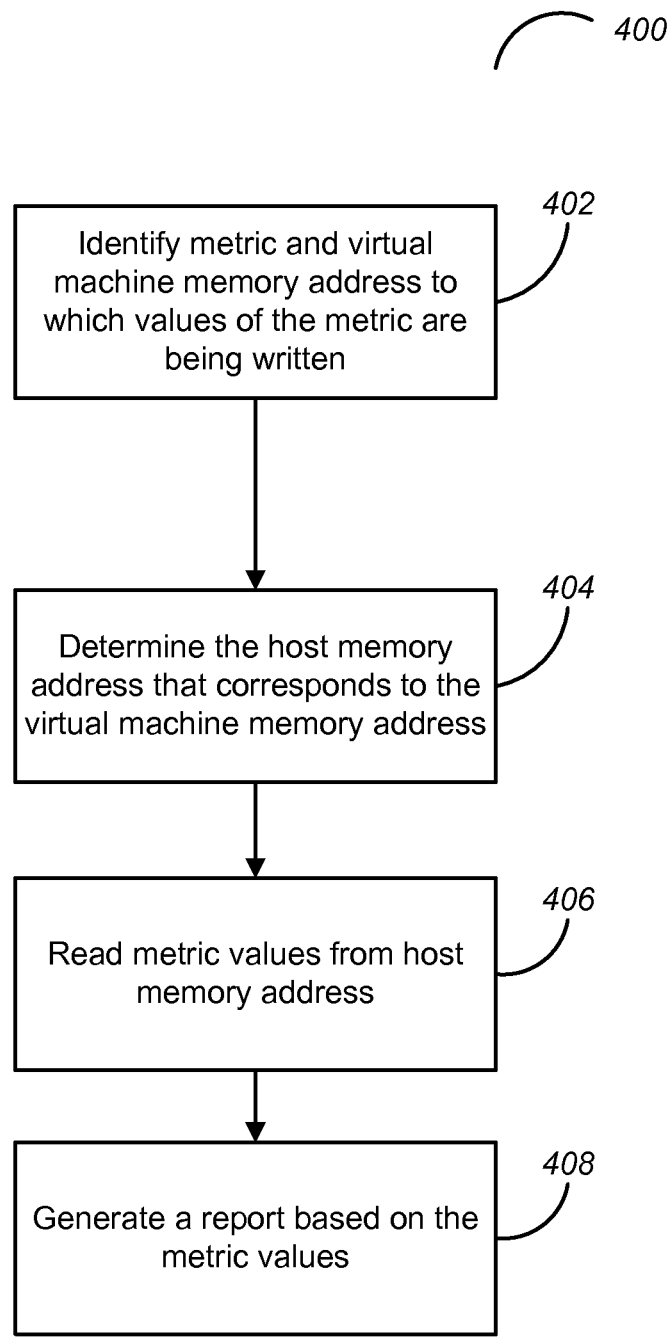
FIG. 4 is a flow diagram illustrating an example technique of reading virtual machine metric values provided by a virtual machine.

FIG. 4 is a flow diagram illustrating an example technique 400 of reading virtual metric values provided by a virtual machine. The technique 400 can be performed by one or more data processing apparatuses. For example, a metrics manager (e.g., metrics manager 150 of FIG. 1) can be used to perform the technique 400.

The metrics manager identifies 402 a virtual machine metric and a virtual machine memory address to which values of the metric are being written. For example, the metrics manager 402 can receive data from a virtual metrics device driver executing as part of the guest software of the virtual machine. The metrics manager can process the data in accordance with an application programming interface (API) in order to identify the virtual machine metric and the virtual machine memory address for the metric.

The metrics manager determines 404 the host memory address that corresponds to the virtual machine memory address. For example, the metrics manager can determine the appropriate host memory address based on pre-determined associations between virtual machine memory addresses and host machine memory addresses.

The metrics manager reads 406 metric values from the corresponding host memory address. For example, the metrics manager can monitor writes to the host memory address and store the data being written to the memory address as values of the virtual machine metric.

The metrics manager generates 408 a report based on the metric values. For example, the report can include data identifying values of the metric over a specified period of time.

Figure 5:
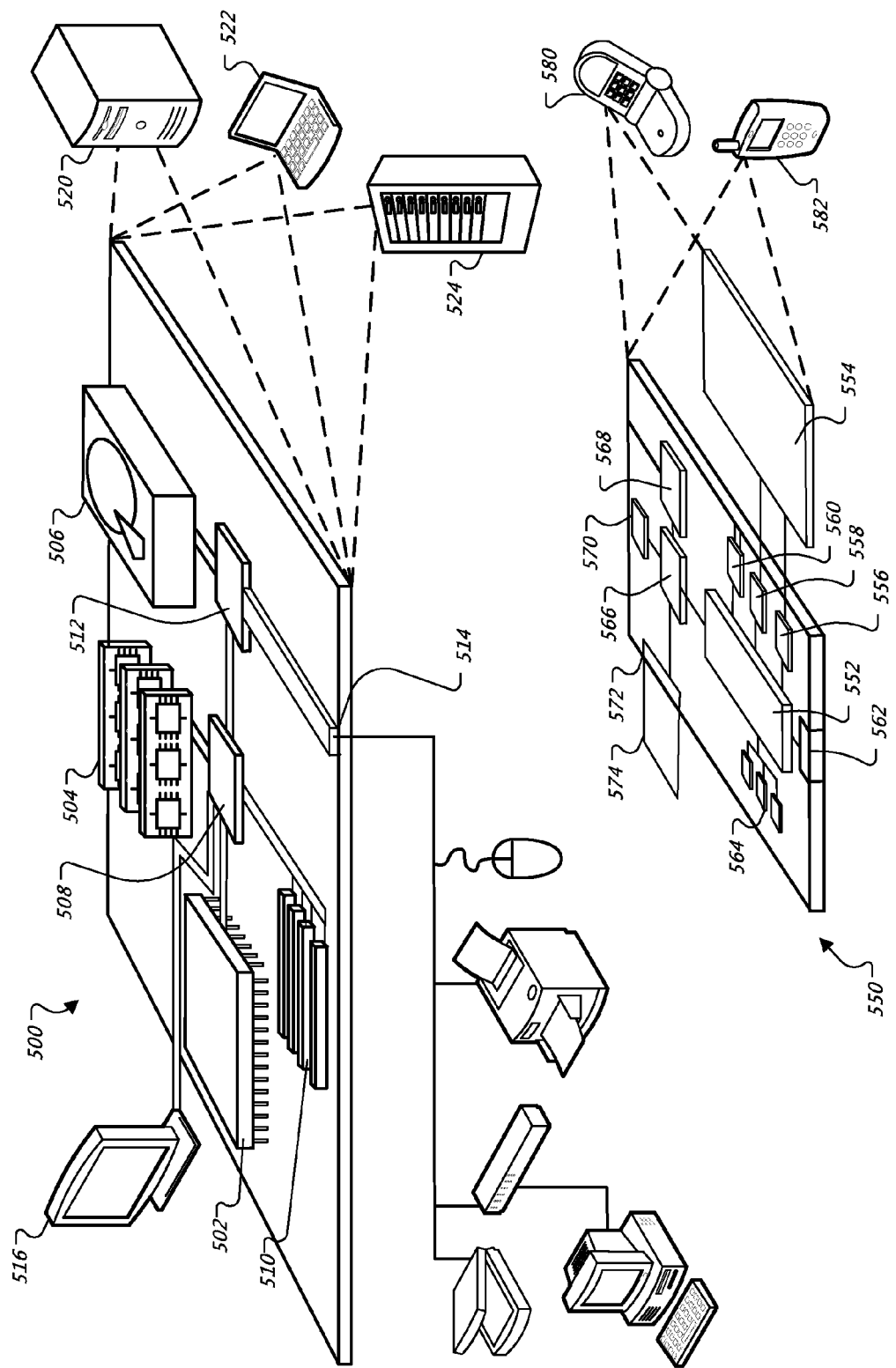
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. The phrase 'computing device' as used herein encompasses its plain and ordinary meaning, including, but not limited to, various forms of digital computers and mobile devices. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 515. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 565 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for virtual machine name resolution may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more computing devices, the method comprising:
   initializing, by a host operating system running on a physical host machine, a virtual machine, the virtual machine including virtual hardware that simulates computer hardware and executes a guest operating system of the virtual machine, wherein the virtual hardware includes a virtual metrics device, wherein the guest operating system includes a virtual metrics driver for the virtual metrics device, wherein, during the initializing of the virtual machine, the virtual metrics driver:
      identifies a virtual machine metric that the virtual metrics device has been configured to collect, wherein the virtual machine metric is a measure of the performance of the virtual machine,
      obtains data identifying a virtual machine memory address to which the guest operating system of the virtual machine writes values of the virtual machine metric, and
      binds, in the virtual metrics device, data identifying the virtual machine metric to the virtual machine memory address, and wherein the virtual metrics device, after the binding of the data identifying the virtual machine metric to the virtual machine memory address:
         exposes, to the host operating system running on the physical host machine, data identifying the virtual machine metric and the virtual memory machine address to which the guest software writes values of the virtual machine metric;
   reading, by the host operating system running on the physical host machine, one or more values of the virtual machine metric from the virtual machine memory address; and
   generating a report based on the one or more metric values.

2. The method of claim 1, wherein reading one or more values of the virtual machine metric comprises:
   mapping the virtual machine memory address to a host memory address.

3. The method of claim 1, wherein the virtual machine metric is a triggered metric, and wherein the virtual metrics device indicates when reported values of the virtual machine metric are valid.

4. The method of claim 1, wherein the virtual machine metric is a non-triggered metric.

5. The method of claim 4, wherein reading the one or more values of the virtual machine metric is performed without further interaction with the virtual machine.

6. The method of claim 1, wherein the data identifying the virtual machine metric is a name of the virtual machine metric.

7. The method of claim 1, further comprising:
   providing a high-level configuration to the virtual machine, wherein the high-level configuration identifies the virtual machine metric and configures a component of the virtual machine to generate values of the virtual machine metric.

8. A computer storage device encoded with instructions which, when executed by one or more computers, cause the one or more computers to perform operations comprising:
   initializing, by a host operating system funning on a physical host machine, a virtual machine, the virtual machine including virtual hardware that simulates computer hardware and executes a guest operating system of the virtual machine, wherein the virtual hardware includes a virtual metrics device, wherein the guest operating system includes a virtual metrics driver for the virtual metrics device, wherein, during the initializing of the virtual machine, the virtual metrics driver:
      identifies a virtual machine metric that the virtual metrics device has been configured to collect, wherein the virtual machine metric is a measure of the performance of the virtual machine, obtains data identifying a virtual machine memory address to which the guest operating system of the virtual machine writes values of the virtual machine metric, and binds, in the virtual metrics device, data identifying the virtual machine metric to the virtual machine memory address, and wherein the virtual metrics device, after the binding of the data identifying the virtual machine metric to the virtual machine memory address:

exposes, to the host operating system running on the physical host machine, data identifying the virtual machine metric and the virtual memory machine address to which the guest software writes values of the virtual machine metric;

reading, by the host operating system running on the physical host machine, one or more values of the virtual machine metric from the virtual machine memory address; and generating a report based on the one or more metric values.

9. The storage medium of claim 8, wherein reading one or more values of the virtual machine metric comprises:

mapping the virtual machine memory address to a host memory address.

10. The storage medium of claim 8, wherein the virtual machine metric is a triggered metric, and wherein the virtual metrics device indicates when reported values of the virtual machine metric are valid.

11. The storage medium of claim 8, wherein the virtual machine metric is a non-triggered metric.

12. The storage medium of claim 11, wherein reading the one or more values of the virtual machine metric is performed without further interaction with the virtual machine.

13. The storage medium of claim 8, wherein the data identifying the virtual machine metric is a name of the virtual machine metric.

14. The storage medium of claim 8, the operations further comprising:

providing a high-level configuration to the virtual machine, wherein the high-level configuration identifies the virtual machine metric and configures a component of the virtual machine to generate values of the virtual machine metric.

15. A system comprising:

one or more computer storage devices encoded with instructions; and one or more computers operable to execute the instructions to perform operations comprising:

initializing by a host operating system running on a physical host machine, a virtual machine, the virtual machine including virtual hardware that simulates computer hardware and executes a guest operating system of the virtual machine, wherein the virtual hardware includes a virtual metrics device, wherein the guest operating system includes a virtual metrics driver for the virtual metrics device, wherein, during the initializing of the virtual machine, the virtual metrics driver:

identifies a virtual machine metric that the virtual metrics device has been configured to collect, wherein the virtual machine metric is a measure of the performance of the virtual machine, obtains data identifying a virtual machine memory address to which the guest operating system of the virtual machine writes values of the virtual machine metric, and binds, in the virtual metrics device, data identifying the virtual machine metric to the virtual machine memory address, and wherein the virtual metrics device, after the binding of the data identifying the virtual machine metric to the virtual machine memory address:

exposes, to the host operating system running on the physical host machine, data identifying the virtual machine metric and the virtual memory machine address to which the guest software writes values of the virtual machine metric;

reading, by the host operating system running on the physical host machine, one or more values of the virtual machine metric from the virtual machine memory address; and generating a report based on the one or more metric values.

16. The system of claim 15, wherein reading one or more values of the virtual machine metric comprises:

mapping the virtual machine memory address to a host memory address.

17. The system of claim 15, wherein the virtual machine metric is a triggered metric, and wherein the virtual metrics device indicates when reported values of the virtual machine metric are valid.

18. The system of claim 15, wherein the virtual machine metric is a non-triggered metric.

19. The system of claim 18, wherein reading the one or more values of the virtual machine metric is performed without further interaction with the virtual machine.

20. The system of claim 15, wherein the data identifying the virtual machine metric is a name of the virtual machine metric.

21. The system of claim 15, the operations further comprising:

providing a high-level configuration to the virtual machine, wherein the high-level configuration identifies the virtual machine metric and configures a component of the virtual machine to generate values of the virtual machine metric.

\* \* \* \* \*